Feb. 18, 1930.                H. A. DOUGLAS                1,748,014
              COMBINED LIGHTING AND SIGNALING SWITCH
                 MECHANISM FOR AUTOMOTIVE VEHICLES
                       Filed Feb. 6, 1928         3 Sheets-Sheet 1
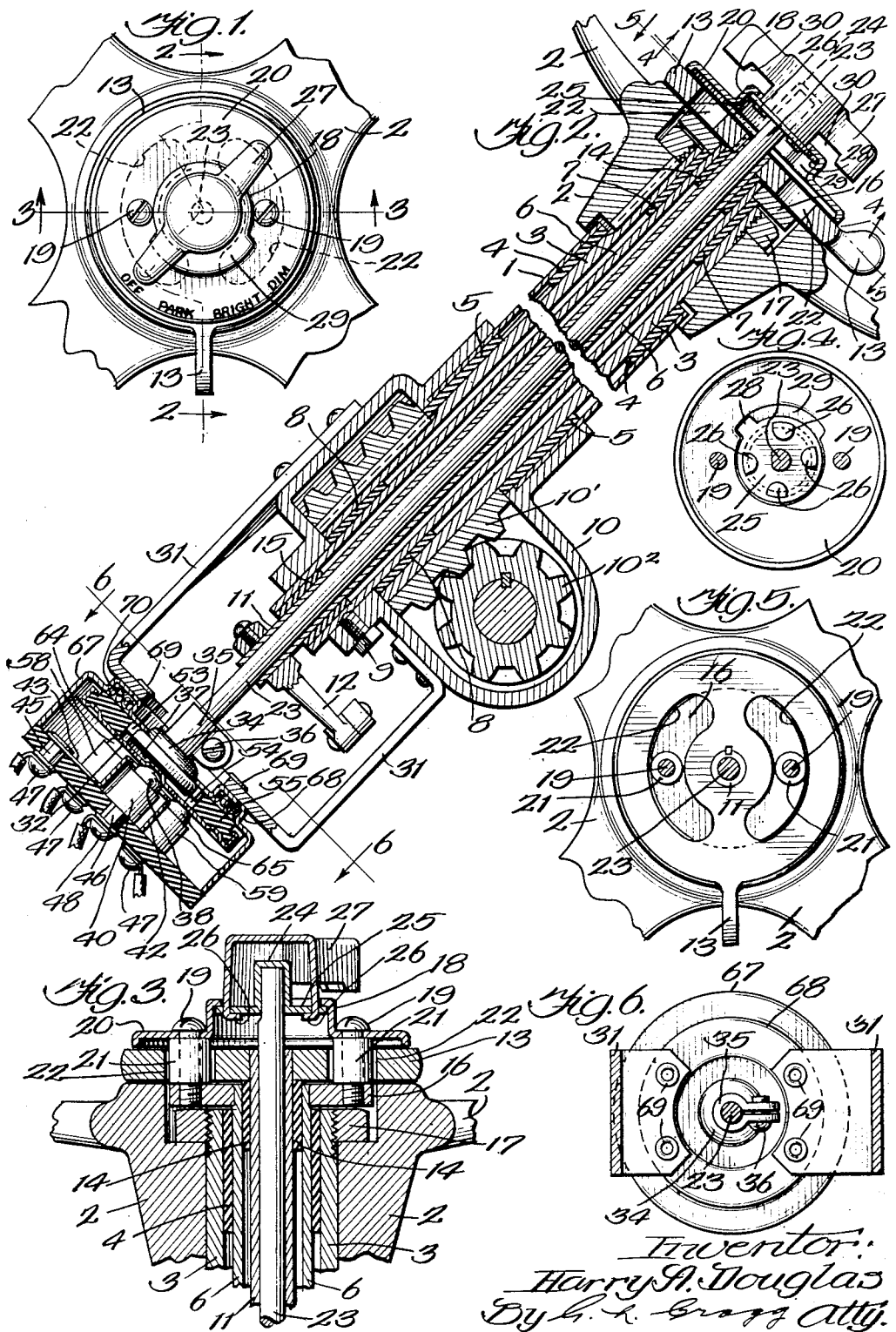

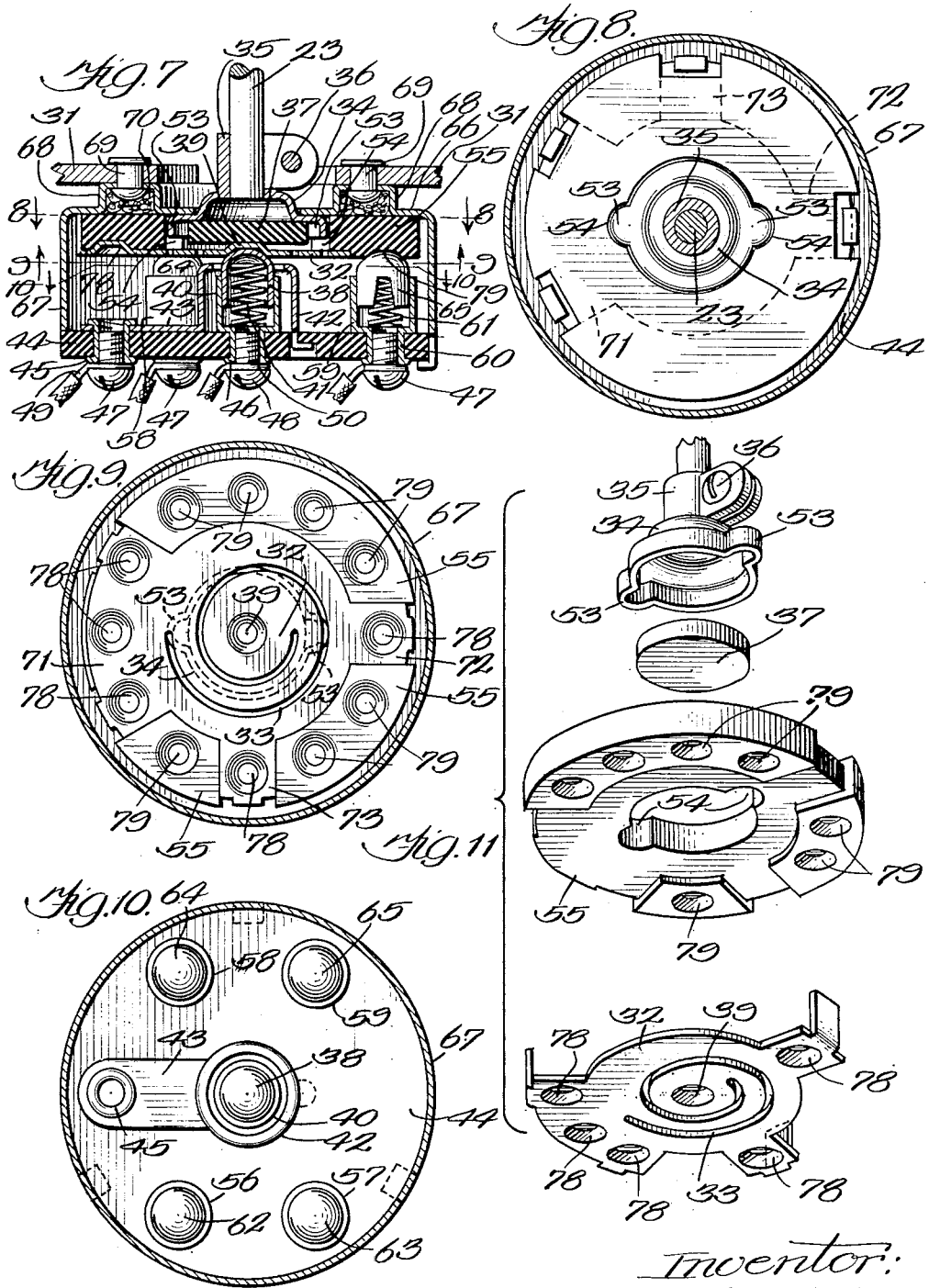

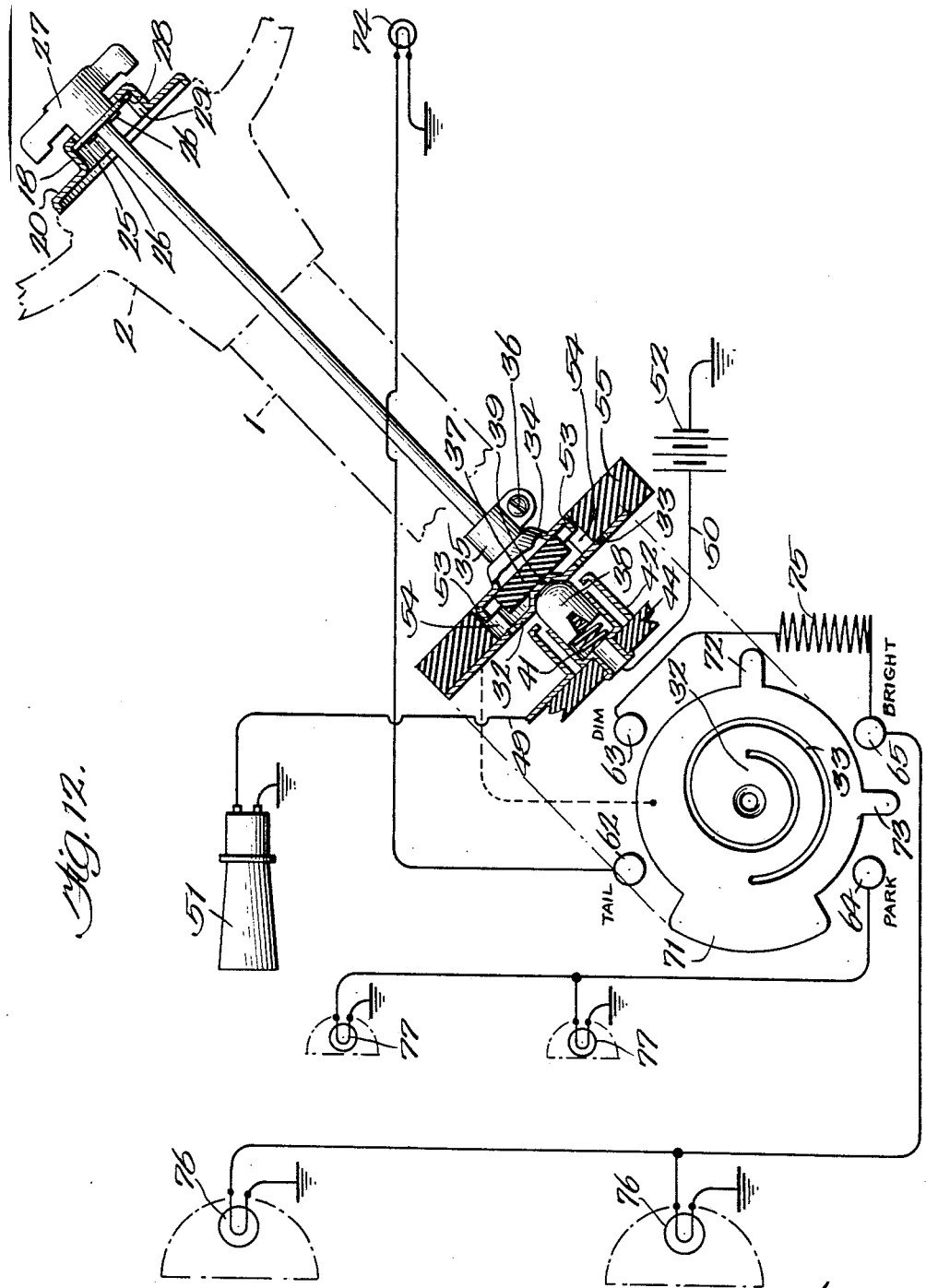

Patented Feb. 18, 1930

1,748,014

UNITED STATES PATENT OFFICE

HARRY A. DOUGLAS, OF BRONSON, MICHIGAN

COMBINED LIGHTING AND SIGNALING SWITCH MECHANISM FOR AUTOMOTIVE VEHICLES

Application filed February 6, 1928. Serial No. 252,279.

My invention relates to automotive vehicles and particularly the lighting and signaling circuits thereof and the switching mechanism that enters into the control of said circuits.

It is the object of my invention to provide unitary mechanism which is in control of both circuits and which employs a single operating element or handle accessible for operation above or on the front side of the steering wheel that is provided upon the upper end of the vehicle steering shaft. In order to avoid the complications which would ensue if the circuit connections were continued to the wheel I employ a rotatable and reciprocable rod that extends along the vehicle steering shaft and is provided with the aforesaid handle at its upper end, the other or lower end of this rod being in the region of the lower end of the steering shaft.

The switching mechanism which is in control of both classes of circuits is at the lower end of the rod and shaft, this switching mechanism being inclusive of a contact actuator which is depressible and rotatable by and respectively upon depression and rotation of said rod. The two classes of circuits are provided with complemental contacts which are disposed to be engaged and separated upon suitable movement of the actuator. The contacts which pertain to the lighting circuit or circuits are engaged upon rotation of the rod and the consequent rotation of the actuator while the contacts pertaining to the signaling circuit are engaged upon depression of the rod and the consequent depression of the actuator.

In the preferred embodiment of the invention, some of the contacts of the circuits are provided upon the contact actuator, the remaining contacts being mounted apart from the contact actuator to be separably engaged by the first mentioned contacts. In order to simplify the construction, a portion only of the actuator is depressible in order to control the signaling circuit, the balance of the actuator being preferably confined to a fixed plane of rotation for the purpose of controlling the lighting circuits.

The invention will be more fully explained by reference to the accompanying drawings in which Fig. 1 is a view looking toward the upper side of the steering wheel and illustrating a portion thereof and parts of the mechanism that are located above the wheel; Fig. 2 is a sectional view on line 2—2 of Fig. 1; Fig. 3 is a sectional view on line 3—3 of Fig. 1; Fig. 4 is a sectional view on line 4—4 of Fig. 2; Fig. 5 is a sectional view on line 5—5 of Fig. 2; Fig. 6 is a sectional view on line 6—6 of Fig. 2; Fig. 7 is a sectional view, on a larger scale, of the lower portion of the structure illustrated in Fig. 2; Fig. 8 is a sectional view on line 8—8 of Fig. 7; Fig. 9 is a sectional view on line 9—9 of Fig. 7; Fig. 10 is a sectional view on line 10—10 of Fig. 7; Fig. 11 is a perspective view illustrating some parts of the switching mechanism in separated relation; and Fig. 12 is a diagram illustrating one circuit arrangement.

The structure illustrated is inclusive of a stationary tubular steering column 1 which is suitably anchored upon the vehicle and above the upper end of which the steering vehicle wheel 2 is mounted and keyed to the hollow vehicle steering shaft 3. This steering shaft is adapted to turn within bearings 4 and 5 that surround it and are surrounded by the column which carries these bearings. Said steering shaft 3 encloses a hollow rod 6 which is coaxial with the shaft and column, this hollow rod being spaced apart from the shaft 3 by bearing sleeves 7 and 8 and being held stationary by a set bolt 9 which passes through the lower end of a gear casing 10 which is in fixed relation to the steering column. This gear casing encloses the worm 10' that is fixed upon the steering shaft 3 and the worm wheel 10² through which the shaft 3 and worm 10' operate the steering ground wheels. Another hollow shaft 11 is surrounded by the aforesaid column, shaft and hollow rod and is coaxial therewith, this shaft 11 being coupled with gas controlling lever mechanism of which a part 12 is illustrated and having a control lever 13 upon its upper end and above the wheel whereby it may be turned. The parts 6 and 11 are spaced by bearing sleeves 14 and 15. A flange 16 is fixed upon the upper end of the stationary rod 6 and overlies the bearing sleeve 7, the upper end of the steering shaft 3 and the nut 17 which is screwed upon the upper end of the steering shaft to maintain the steering wheel 2 in assembly with this shaft.

The inverted cup 18 is held in a stationary position by means of screws 19 which pass through the flange 20 of the cup and into the stationary flange 16 upon the stationary rod 6. The portion 20 may also serve, if desired, as an escutcheon plate, Fig. 1, having thereon designations of the different circuit adjustments that correspond to the different adjustments of the lighting circuits. Spacing sleeves 21 hold the cup in spaced apart relation to the flange 16 to accommodate the lever 13 which has arcuate slots 22 through which the screws 19 and spacing sleeves 21 are passed, these slots being of sufficient length to permit the lever 13 to turn throughout the desired range. A rotatable and reciprocable rod 23 is journaled within the hollow shaft 11, this rod projecting above the steering hand wheel 2 and considerably below the steering column 1 and steering shaft 3. The upper end of the rod 23 is fixed within the hub 24 that projects upwardly from the disc 25. This disc is formed with openings therethrough through which the tongues 26 of a sheet metal handle 27 are passed, these tongues being clinched against the under face of said disc, as illustrated in Figs. 2, 3 and 4. As illustrated, the handle 27 and rod 23 are confined, in their turning movement, to an arc of travel. To this end, the disc 25 is provided with a tongue 28 which is received within an arcuate recess 29 provided within the cylindrical wall of the stationary cup 18.

The end or top wall of the cup, through which the handle 27 and the hub portion 24 are passed, serves as an abutment which defines the extent to which the rod 23 and handle 27 may be moved upwardly to a position in which the signaling circuit is maintained open, as will hereinafter appear. When the signaling circuit is to be closed, the handle 27 and rod 23 are depressed, the handle being formed with recesses 30 which receive the cup when the handle is depressed. When the handle is employed to depress the rod 23, it performs the function of a push button. In order that it may readily be adapted to turn the rod 23 also, it is elongated transversely of its axis of rotation to form, with the rod 23, a T. By reason of this shape, the handle may readily be turned by the thumb and index finger which press upon it in the same circular direction. The switching mechanism which is controlled by the rod 23 is carried at the lower end of a bracket structure 31 which is carried upon the lower end of the stationary steering column 1 by being screwed to the gear casing 10. A spring 32 presses upon the rod 23 longitudinally of its axis to normally maintain this rod together with the handle thereon in the uppermost position along the axis of this rod. This spring is also a contact actuator, this actuator being also preferably a contact carrier to which end this spring is in the form of a resilient metallic plate through which a spiral slot 33 is cut around the axis of the rod 23 whereby the central portion of the plate constitutes a flat spring tongue which, by virtue of its resiliency, is normally constrained to remain within the general plane of the plate. The spiral slot 33 terminates within the border of the plate that surrounds the slot. A socket 34 is provided upon the lower end of the rod 23, this rod having a split stem 35 which is clamped upon the rod by the screw 36. A disc 37 of insulation is received in said socket and pressed upon by the top side of the central spring tongue portion of the plate 32. The upper end of a metallic plunger contact 38 is received in the inverted cup shaped recess 39 that is centrally formed in the plate 32. The contact 38 is received within a metallic spring barrel 40 which also receives a coiled spring 41 which presses upwardly upon the contact 38, the spring 41 cooperating with the spring tongue portion of the plate 32 in maintaining the rod 23 and the handle 27 in their uppermost position. The plunger contact 38 and the metallic spring barrel 40 are surrounded by a metallic housing 42 which has a lateral extension 43 that is clamped against a contact carrying insulating disc 44 by means of a sleeve rivet 45. The spring barrel 40, itself, has a hollow sleeve continuation 46 which is also riveted to the disc 44. Binding screws 47 and 48 are screwed into said sleeves 45 and 46 to clamp circuit wires 49 and 50 in mechanical and electrical connection with said sleeves. The wire 49 is grounded through the horn or other signaling device 51. The wire 50 is grounded through the battery 52. When the handle 27 and rod 23 are depressed, the spiral spring tongue at the central portion of the plate 32 is depressed into engagement with the metallic housing 42 whereupon the signaling device 51 operates. When the pressure upon the handle 27 is relieved, the plate 32 and the coiled spring 31 restore the handle and the rod 23 to their uppermost position.

The socket 34 is formed with laterally projecting ears 53 which are received within diametrically opposite recesses 54 that are provided within the insulating ring 55 upon which the plate 32 is secured, this plate and ring together constituting a contact actuator and carrier. Other metallic spring barrels 56, 57, 58 and 59 are provided with sleeve extensions 60 which are also secured to the disc 44. These spring barrels contain springs 61 which press upwardly upon the plunger contacts 62, 63, 64, and 65 which, in turn, press upwardly against the insulating ring 55 or against the plate 32, according to the position to which this ring is turned consequent upon turning the rod 23 and handle 27. Said spring pressed contacts 62, 63, 64 and 65 press the ring 55 against the uppermost or end wall 66 of an inverted cup whose cylindrical wall 67 surrounds the ring 55 and the disc 44, this disc constituting a closure that is clinched upon the rim of the cup. The cup wall 66 has an annular extension 68 which is secured to the bracket structure 31 by the rivets 69. Waterproof packing 70 is contained in the annular channel that is defined within said annular extension 68.

The plate 32 is provided with fingers 71, 72, and 73 which are clinched into engagement with the ring 55. When the switch is in the adjustment illustrated in Fig. 12, all of the circuits are open, the signaling circuit being adapted to be closed in the manner hitherto described following the depression of the rod 23. When said rod is turned by turning the handle 27, the socket 34, through the intermediation of its ears 53 and the recesses 54, turns the ring 55 to adjust the lighting circuits, this ring being preferably confined to a fixed plane of rotation, the signaling circuit being closable merely by depressing the central portion of the plate 32 without any consequent depression of the ring 55. When said ring and the plate 32 have been turned to bring the finger 71 into connection with the contacts 62 and 63, two circuits are established, one circuit including the grounded battery 52 through the wire 50, the contact 38, the plate 32, the contact 62, and the grounded tail lamp 74. The other circuit includes the grounded battery 52, the wire 50, the contact 38, the plate 32, the contact 63, the dimming resistance 75, the contact 65, and the gounded head lamps 76 that are in parallel, these lamps then glowing dimly. When these two circuits are thus established, the contact fingers 72 and 73 are out of circuit. When the ring 55 and plate 32 are turned to bring the contact finger 72 into connection with the contact 65, the contact 63 is out of circuit whereby the dimming circuit is opened, a circuit for brightly illuminating the lamps 76 then being established and which is inclusive of the grounded battery 52, the contact 38, the plate 32, the contact 65 and said lamps 76, in parallel. When the ring 55 and plate 32 are turned to bring the finger 73 into engagement with the contact 64, the lamps 76 are both out of circuit and the parking lamps 77 are included in circuit, this circuit containing the grounded battery 52, the contact 38, the plate 32, the contact 64 and said lamps 77 which are grounded and in parallel.

It is observable that the horn 51 may be sounded when the ring 55 and plate 32 are turned to any position. The plate 32 is also formed with other inverted cup shaped recesses 78 in which the lighting circuit contacts 62, 63, 64 and 65 or certain of them are receivable when any of the lighting circuits are closed, the recesses 78 cooperating to hold the contact carrier or actuator 32, 55 in lighting circuit closing position. The ring 55 is itself provided with inverted cup shaped depressions 79 which also receives said lighting circuit contacts 62, 63, 64 and 65 or certain of them to further hold said contact carrier or actuator 32, 55 in the position to which it is turned.

As has hitherto been stated, the signaling circuit may be operated with the contact carrier or actuator 32, 55 turned to any position. It is also apparent that the lighting circuits may be adjusted while the signaling circuit is closed as well as when it is opened.

Changes may be made without departing from the invention.

Having thus described my invention, I claim:

An electric switch inclusive of two complemental contact members, one of these members being a resilient plate having a spiral slot formed therethrough and terminating within the border of the plate that surrounds the slot; and means for depressing a portion of the plate that is between parts of the spiral slot, this plate portion having a contact part that is engageable with the contact member that is upon the other contact member.

In witness whereof, I hereunto subscribe my name.

HARRY A. DOUGLAS.